United States Patent
Abouyounes

(10) Patent No.: US 7,604,166 B2
(45) Date of Patent: Oct. 20, 2009

(54) METHOD AND SYSTEM FOR FLEXIBLE PURCHASES USING ONLY FINGERPRINTS AT THE TIME AND LOCATION OF PURCHASE

(75) Inventor: Rania Abouyounes, 4693 Shadetree Crescent, Windsor (CA) N9G 2V1

(73) Assignee: Rania Abouyounes, Windsor, ON (CA)

( * ) Notice: Subject to any disclaimer, the term of this patent is extended or adjusted under 35 U.S.C. 154(b) by 2 days.

(21) Appl. No.: 11/423,482

(22) Filed: Jun. 12, 2006

(65) Prior Publication Data

US 2007/0284432 A1 Dec. 13, 2007

(51) Int. Cl.
*G06K 5/00* (2006.01)
(52) U.S. Cl. .................... 235/380; 235/379; 235/382
(58) Field of Classification Search ............. 382/115; 235/380, 382, 379, 382.5, 492, 493
See application file for complete search history.

(56) References Cited

U.S. PATENT DOCUMENTS

| | | | |
|---|---|---|---|
| 5,180,901 A | 1/1993 | Hiramatsu | |
| 5,648,648 A | 7/1997 | Chou | |
| 5,869,822 A | 2/1999 | Meadows, II | |
| 6,028,950 A | 2/2000 | Merjanian | |
| 6,212,290 B1 | 4/2001 | Gagne | |
| 6,523,745 B1 | 2/2003 | Tamori | |
| 6,594,376 B2 * | 7/2003 | Hoffman et al. | 382/115 |
| 6,636,620 B1 | 10/2003 | Hoshino | |
| 6,944,773 B1 | 9/2005 | Abrahams | |
| 2003/0149661 A1 * | 8/2003 | Mitchell et al. | 705/39 |

* cited by examiner

*Primary Examiner*—Seung H Lee

(57) ABSTRACT

A method and system for flexible payments to enable buyers to pay for goods and services using only their fingerprints at the time and location of purchase. The method is based on buyers registering their fingerprints and one or more payment methods such as financial credit cards or bank accounts and relating one or more of their fingerprints to one or more registered convenient rules that will act on behalf of buyers at the time of purchase to select the appropriate payment method based on purchase conditions such as purchase amount, purchase location and purchase time. Buyers can use their fingerprints to instantly pay for purchases where the payment system automatically matches the fingerprint at the time of purchase to registered fingerprints and uses the purchase amount, purchase location and purchase time to evaluate the conditional part of all registered convenient rules related to the matched fingerprint where the action part of one rule is used to select and further charge one or more of the previously registered payment methods.

11 Claims, 4 Drawing Sheets

Fingerprint Registration and Billing System

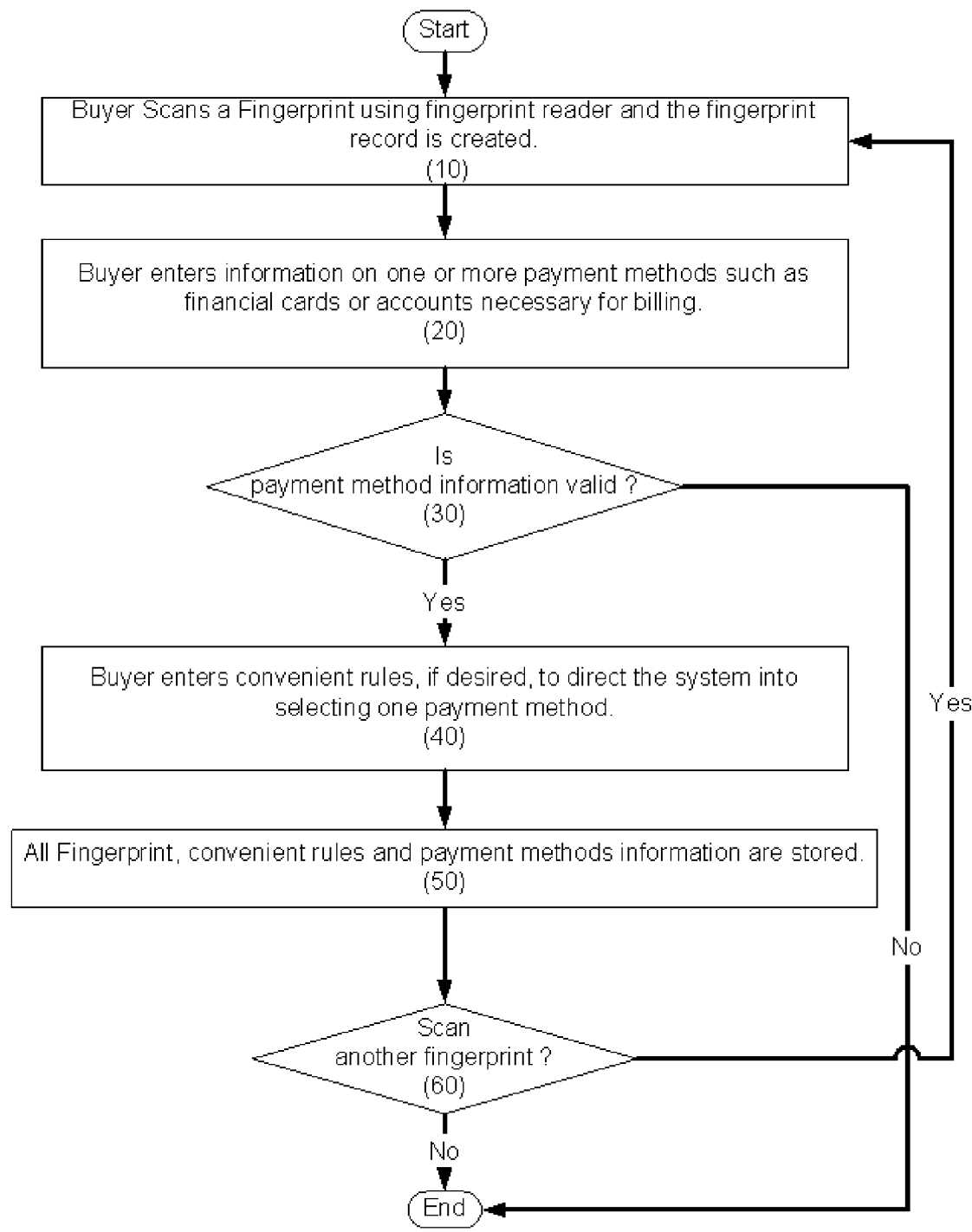
Fig. 1 Fingerprint Registration Process

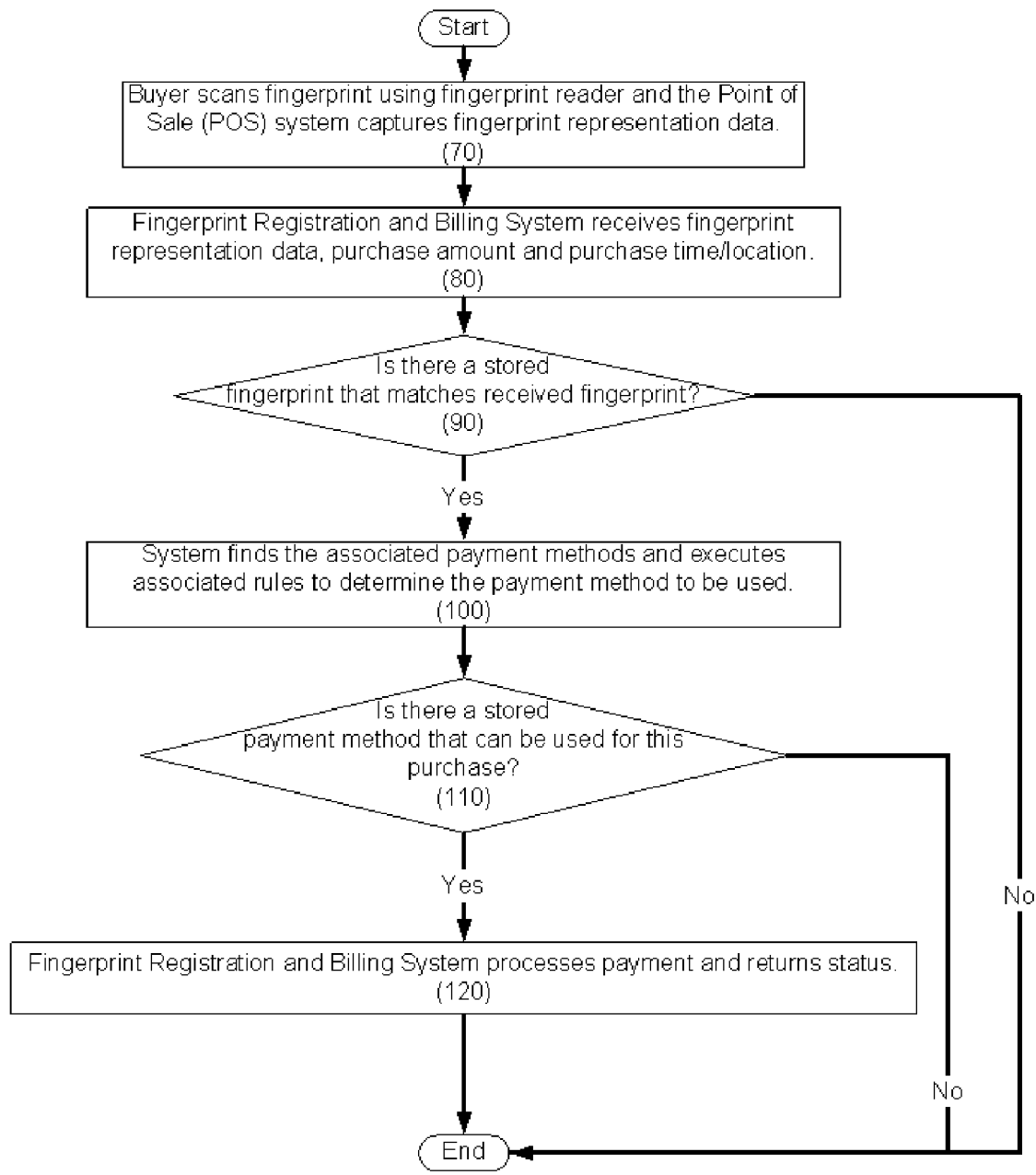
Fig. 2 Purchase Process

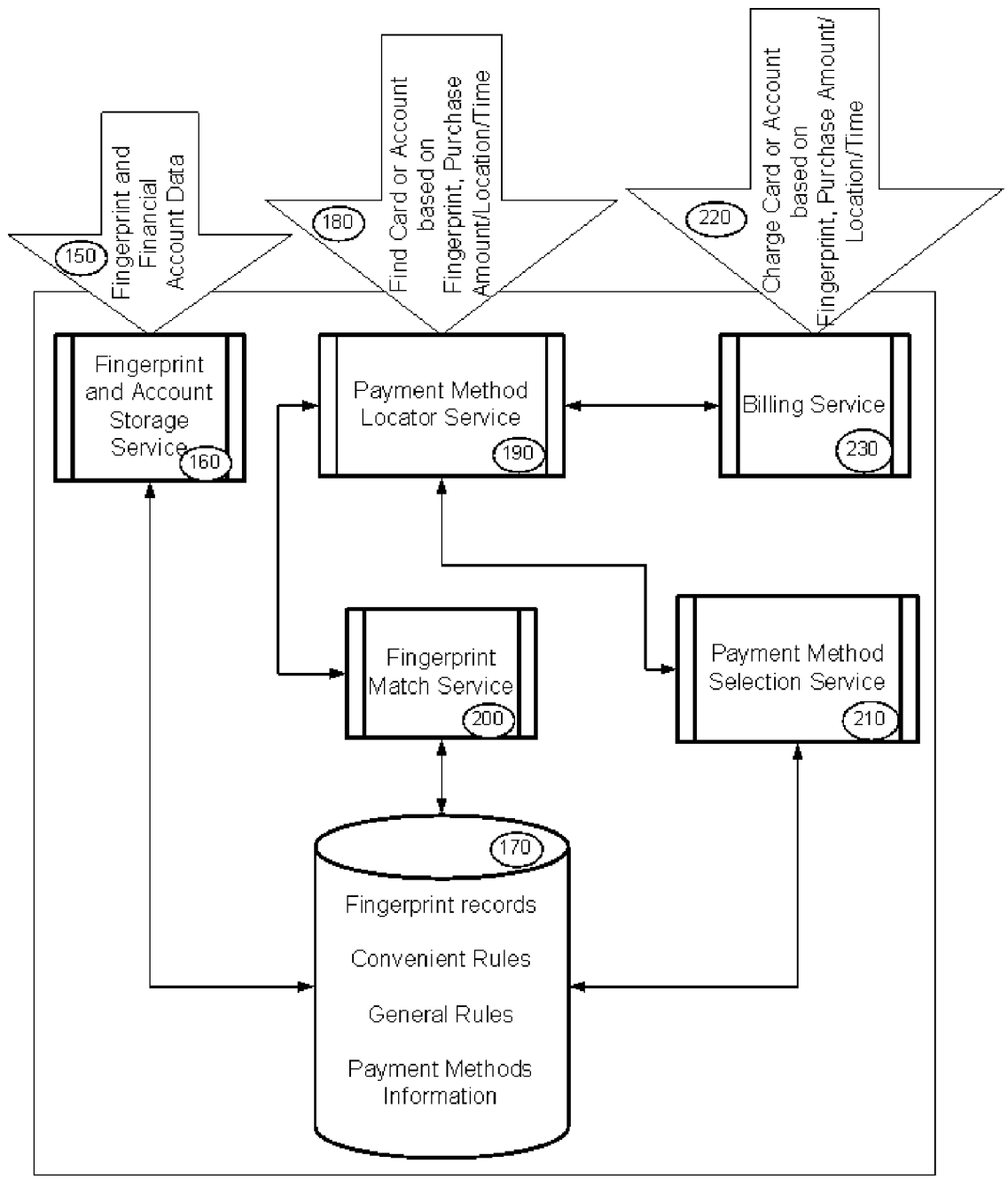
Fig. 3 Fingerprint Registration and Billing System

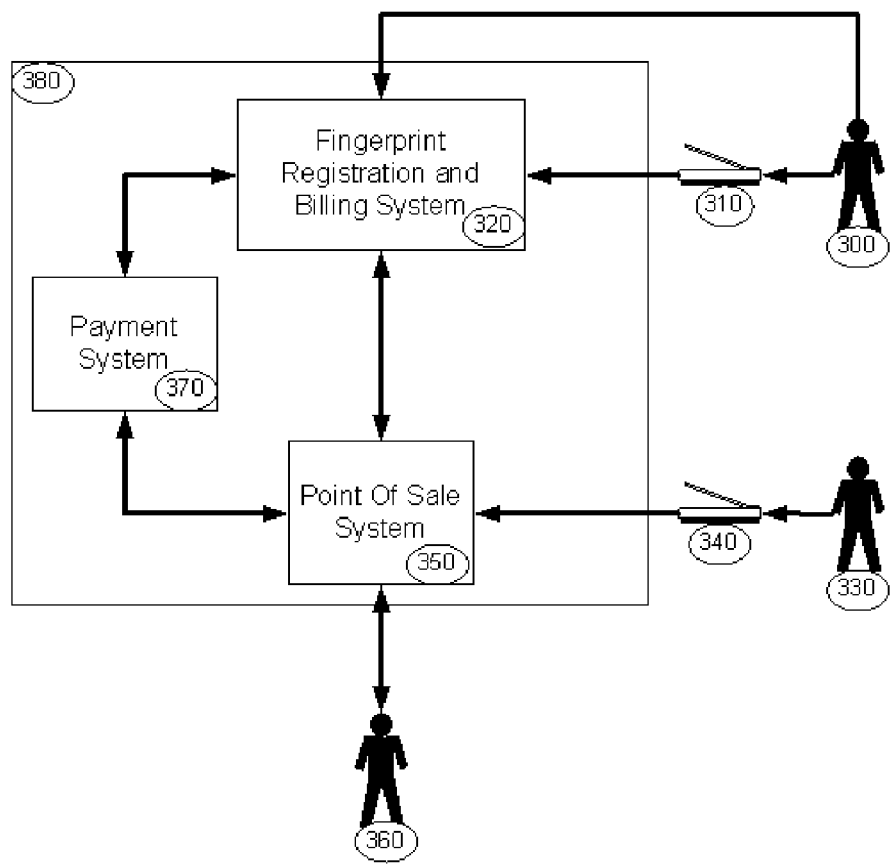
Fig. 4 Fingerprint Registration and Billing System Interaction with other systems

METHOD AND SYSTEM FOR FLEXIBLE PURCHASES USING ONLY FINGERPRINTS AT THE TIME AND LOCATION OF PURCHASE

FIELD OF THE INVENTION

The invention is related to the flexible and quick purchase of goods and services using the fingerprints of buyers.

BACKGROUND OF THE INVENTION

Most people own credit or debit cards that allow them to charge payments when buying goods and services or withdrawing cash from automated teller machines (ATM). Card holders have to carry their cards and present them at cash registers or insert them into ATMs. The cards are swiped into special devices that can read the data embedded on the card and send the data in addition to the payment amount to the payment authority to validate the card data and available money balance on the card. In the case of credit cards, the payment is automatically charged to the account and the card holder signs a payment receipt to authorize the payment. In the case of debit cards, the card holder enters a personal identification number (PIN) that must match a previously stored PIN on the payment authority. There are also prepaid cards that hold a prepaid amount of money or in the case of cash where payment is the quickest without the need to sign a receipt or enter a PIN.

One common disadvantage of all of these types of payment methods is that they all have to be physically carried with the buyer whenever they are used. This creates a risk to buyers as the cards or cash could be lost, stolen, damaged or fraudulently obtained. Also, signatures could be forged and PINs could be forgotten.

In one attempt to further identify card holders, biometric information in the form of fingerprints has been heavily explored. Fingerprints are unique and can easily be read by fingerprint readers that are commercially available. Fingerprints can also be collected from buyers when they obtain or activate their credit or debit cards. Much of the art that employ fingerprints in financial transactions have been circulating around replacing signatures and PINs with fingerprints that could uniquely identify buyers and authorize payments. Such fingerprint data could be embedded on the card in some form and the extracted fingerprint data from buyers at the time of purchase can be matched against stored fingerprint data to find a match. However, all these patents do not address the issue of physically carrying a credit or debit card when making a purchase or money withdrawal. When physically carrying cards or checks to make a purchase, the account information is sent from the purchase location and transmitted to the remote payment institution to charge the account. If a shopper wants to visit more than one store then they may need to use the card issued by such particular stores instead of a generic card which could be inconvenient for shoppers. Furthermore, combining fingerprints with financial cards or accounts adds additional hardware that is needed at the location of purchase where a card reader and a fingerprint reader are needed.

A search of prior art did not disclose any patents that read directly on the claims of this invention. However, some existing U.S. patents were considered to be related to the subject of using fingerprints in financial transactions:

| U.S. Pat. No. | INVENTOR | ISSUED |
| --- | --- | --- |
| 5,869,822 | Meadows, II; Dexter L. | Feb. 9, 1999 |
| 5,180,901 | Hiramatsu; Kenichi | Jan. 19, 1993 |
| 6,212,290 | Gagne; Patricia C. | Apr. 3, 2001 |
| 6,636,620 | Hoshino; Satoshi | Oct. 21, 2003 |
| 6,028,950 | Merjanian; J. M. | Feb. 22, 2000 |
| 6,523,745 | Tamori; Teruhiko | Feb. 25, 2003 |
| 5,648,648 | Chou; Ken W. | Jul. 15, 1997 |
| 6,944,773 | Abrahams; M. D. | Sep. 13, 2005 |

In U.S. Pat. No. 5,869,822, a patent is disclosed where the fingerprint data is encoded on the card and stored in a card database and/or a server database; the card owner registers the fingerprint and associates it with the card. At the time of use, the fingerprint data is compared with the encoded data on the card or server database. The card holder has to use and present the card at the time of purchase and there is no capability to associate more than one card with a fingerprint where the system selects a card based on previously defined rules. U.S. Pat. Nos. 5,180,901, 6,212,290 and 6,636,620 work in a similar fashion where the fingerprint data is encoded on the card in different forms.

In U.S. Pat. No. 6,028,950, a patent is disclosed for a fingerprint controlled set-top box. The operator's fingerprint is scanned and compared to the stored fingerprint data within a set-top box, a remote server, a central station, or on a card. The set-top box obtains and stores account information of the identified operator for at least one of a credit card, debit card, and smart card. The fingerprint data and account information of the set-top box operator are obtained at the time of usage or purchase where the fingerprint data is compared with stored fingerprint data and if a match is achieved the account of the operator associated with a selected card, the card being one of a credit card, debit card, and a smart card is billed. The account information is obtained and sent with the fingerprint data at the time of purchase to a remote location so the selected card can be charged. Also, the set-top box operator does not have the ability to associate more than one card with a fingerprint where the system selects a card based on previously defined rules.

In U.S. Pat. No. 6,523,745, a patent is disclosed where the fingerprint data is used to encode the message sent across the system and the same stored fingerprint data is used to decode the original message. Also, an IC card is detailed with a built-in fingerprint identification apparatus which can store fingerprint and currency data values but the IC card is needed to make the purchase. A card is needed and used to perform a transaction and the account information is obtained and sent with the fingerprint data at the time of purchase. Also, there is no ability to associate more than one card with a fingerprint where the system selects a card based on previously defined rules.

In U.S. Pat. No. 5,648,648, a system was detailed to raise the percentage of accuracy of fingerprint recognition system using acceptance and rejection comparisons. An access file is generated for each account where the access file specifies a plurality of different acceptance and rejection levels. The system receives fingerprint data of a requester and its accompanying request for a transaction and account information where account information is sent as part of the request.

In U.S. Pat. No. 6,944,773, a method and apparatus for fingerprint authentication during on-line transactions was patented. User can use up to 10 fingerprints for authentication during an online transaction so that fingerprints authentication can replace the username and password authentication. The scanned fingerprints using a fingerprint reader are compared with stored fingerprints in the database. This patent only makes use of fingerprints for authentication of online transactions and does not address the association of fingerprints with one or more financial cards and accounts for online and offline transactions.

SUMMARY OF THE INVENTION

The method and systems in this invention makes use of fingerprints as the only physical mean needed to purchase goods and services at the time and location of purchase. Many proposals have been made to employ the unique characteristic of biometric data such as fingerprints as an identification or authorization mechanism in addition to presenting a card at the time and location of purchase where fingerprints are intended to securely and uniquely identify buyers. This method is different as it uses fingerprints alone to make a purchase and no account information is presented at the location of purchase. The method also allows buyers to associate one or more fingerprints to one or more financial cards and accounts by allowing buyers to register and relate one or more convenient rules to one or more fingerprints where the system can automatically use the registered convenient rues to select and charge one of the financial cards or accounts at the time of purchase. Eliminating the need for cards or checks while shopping adds the flexibility and security to shopping where buyers can specify when and where to use their financial cards and accounts in relation to their fingerprints. This method also reduces the risk of financial cards and accounts from being misused, lost or forged where buyers can use convenient rules to direct the system into selecting the appropriate payment method only when fingerprint matches a registered fingerprint and the conditional part of one of the pre-registered convenient rules is satisfied for certain purchase conditions such as the purchase amount, purchase time and/or location. Even if the fingerprint of a buyer who uses this method is comprehend, this method provides protection to the buyer where one conditional part of one of the convenient rules need to be satisfied for a payment method to be selected to pay for the purchase. For example, a purchase amount can be charged to a different card based on the purchase amount or a special card can be charged based on the location of the purchase. Buyers can associate different cards to different fingers as they wish. Buyers can also use their billing address information as a payment method where the system can collect the purchases and bill buyers at regular times. There are many companies that already have systems that are able to link fingerprint readers to large fingerprint databases to quickly authenticate users. Furthermore, there have been many proposals to associate fingerprints with financial cards as a method of payment. The method of this invention is different in two aspects.

The first aspect of the invention is to provide buyers, prior to their first purchase, the ability to protect how their payment methods are being used. This ability is provided when a buyer tries to associate or relate one or more fingerprints with one or more of his or her payment methods (e.g. financial cards and accounts). This relationship is indirect because there are registered convenient rules that are rather directly related to one or more registered fingerprints. Each rule has an action component that directs the system into selecting one or more payment methods when the conditional component of such rule is satisfied. The conditional component is where the buyer can specify what purchase amount is permitted as well as which purchase location and at what time this purchase can be allowed and when these conditions are satisfied for that specific purchase time and location then one or more registered payment methods that are defined in the action component of the rule can be selected to pay for the purchase as defined by the buyer. At least one of the registered convenient rules will need to fire meaning that its conditional component is satisfied for the purchase to continue which means that the purchase is bound to the buyer rules even if the correct fingerprints was presented at the time of purchase.

The second aspect of the invention is when the system acts on behalf of buyers at the time of purchase using previously stored convenient rules to select and charge one or more registered payment methods. When buyers attempt to purchase goods and services, they are prompted to scan their fingerprints using a fingerprint reader as the only proof of identity and method of payment. The system tries to match the scanned fingerprint with the stored fingerprints. If a match is found, the system tries to on behalf of the buyer to use the purchase amount and purchase time and location that are only known at the time of purchase to evaluate the conditional components of all convenient rules that were previously registered and related to the matched fingerprint. When at most one of the conditional components of any rule is satisfied, the system will use the action component of such rule as previously defined by the buyer to select and charge one or more of the registered payment methods.

BRIEF DESCRIPTION OF THE DRAWINGS

FIG. 1 shows the fingerprint registration process of the present invention;

FIG. 2 shows the purchase process of the present invention;

FIG. 3 is a schematic diagram illustrating a system that incorporates a method in accordance with one embodiment of the present invention; and FIG. 4 is a block diagram illustrating the interaction of the system in FIG. 3 with other systems.

DETAILED DESCRIPTION OF THE ILLUSTRATED EMBODIMENTS

A simple process flow that can occur prior to the first purchase when using this proposed method is shown in FIG. 1 where the buyer attempts to scan his fingerprint using a fingerprint reader and the fingerprint record with the fingerprint representation data is created (10). The buyer then enters all information necessary to process payments for each payment method (20). For example, if the payment method is a Credit Card the information could be the card number, expiration date and name on the card. In case of financial bank accounts, it could be the checking account number, bank information and name on the account. The buyer can use a bill me later type method and just enter the billing address information and other related personal information. The buyer can also deposit cash and use a pre-paid type account. In general, all methods of payments could be used. An initial validation could be performed to ensure that the payment method information is valid (30) and this could be done in many ways where the card and account issuing party could be contacted to request a validation or a communication could be sent in the form of mail to validate the name and address on the account. Buyers can also setup, if they desire to continue with the registration process, convenient rules (40) to direct the system into selecting the best payment method depending on information and conditions known at the time of purchase (e.g. purchase amount, purchase time, purchase location).The setup involves specifying conditions based on the purchase amount, purchase time and purchase location so when such conditions are satisfied, at the time of purchase, then the defined payment methods that are part of the action component of such rule will be selected to pay for purchase. For example, a buyer can select to pay for half of the purchase using one payment method and the other half on another payment method. The setup also involves relating one or more of such rules to one or more of the fingerprints records. For example, a buyer may want to always use a pre-paid cash account for purchases less than a specific amount or a buyer may want to charge a specific card when shopping at a specified store. All information is stored (50) to be used at the time of purchase. The system can prompt the buyer to scan another fingerprint (60) and repeat the process. Other fingerprints can map to the same list of payment methods and rules.

FIG. 2 shows an example of a purchase process where the system is processing the payment on behalf of the buyer. When the buyer is ready to pay for his purchase, the buyer scans his fingerprint using a fingerprint reader and the Point of Sale (POS) system located at the purchase location captures the fingerprint representation data (70). The POS system sends the fingerprint data, purchase amount and other available data to the fingerprint registration system (80). The Fingerprint Registration and Billing system receives the fingerprint data and tries to match it against existing fingerprints (90). If no match is found then the purchase can not be completed. If a match is found, the system executes the previously stored convenient rules and other general rules related to the fingerprint record to try and select the appropriate payment method that need to be used (100). If the System does not find a stored payment method that can be used for this purchase (110) then the purchase can not be completed otherwise the Fingerprint Registration and Billing system uses the found payment method to contact the appropriate payment system and charge the selected card or debit the selected account and return status back to the POS system (120).

FIG. 3 depicts one possible design of the Fingerprint Registration and Billing System. At the time of registration and prior to the first purchase, the system receives fingerprint representation data in addition to the payment methods information (150). The Fingerprint and Account Storage Service (160) receives and stores the fingerprints, payment methods and rules information into the database (170). At the time of purchase, the system can provide two services. The first service provided by the system is when a request is received to find the associated payment method given a fingerprint, purchase amount, purchase time and purchase location (180). The Payment Method Locator Service (190) first uses the Fingerprint Match Service (200) to find the stored fingerprint record with fingerprint representation data that matches the received fingerprint representation data. The Payment Method Locator Service (190) then uses the found fingerprint record to call the Payment Method Selection Service (210) that in turn finds and executes the stored convenient and general rules and returns the associated payment method information whether it is a financial card or account. The second service provided by the system is when a request is received to charge the associated payment method given a fingerprint, purchase amount, purchase time and purchase location (220). The Billing Service (230) uses the Payment Method Locator Service (190) to find the associated payment method and consequently charges or debits the found card or account and returns status to the caller.

FIG. 4 depicts one interaction design of the Fingerprint Registration and Billing System with other systems. At the time of fingerprints and account registration, the buyer (300) scans his fingerprints using a fingerprint reader (310) where the fingerprint representation data are stored in the Fingerprint Registration and Billing System (320). The buyer (300) manages his payment methods in addition to the convenient rules using the Fingerprint Registration and Billing System (320). At the time of purchase, the buyer (330) starts by scanning his fingerprint using a fingerprint reader (340) that sends the fingerprint representation data to the Point of Sale (POS) System (350). The operator of the POS System (360), which could be the buyer, enters the purchase amount into the POS System (350). The fingerprint data and purchase amount along with other information such as the purchase location and time of purchase are sent to the Fingerprint Registration and Billing System (320). If the POS System (350) is processing the payment then it requests the associated payment method information whether it is a financial card or account information from the Fingerprint Registration and Billing System (320). If the Fingerprint Registration and Billing System (320) is processing the payment then it returns a status to the POS System (350). In either case, the Payment System (370) is called to charge or debit the financial card or account as appropriate. The three systems namely the Fingerprint Registration and Billing System (320), the POS System (350) and the Payment System (370) could be subsystems of one large system (380) and the patent does not limit how such systems are micro designed and implemented. However, the patent outlines the main task of the Fingerprint Registration and Billing System to find the appropriate payment method and charge a payment method based on fingerprints provided at the time of purchase without the need for buyers to provide payment method information at the time and location of purchase.

What is claimed is:

1. A method for providing flexible payments to allow buyers to pay merchants using fingerprints of buyers and previously registered convenient rules without the need to carry and present financial payment methods [such as debit and credit cards] at the time and location of purchase, comprising: (a) a buyer registers one or more said fingerprints where a fingerprint in machine readable form is called a fingerprint record; (b) a buyer registers one or more said financial payment methods that can be debited; (c) a list of said merchants exists where each merchant has one or more merchant location records and each said merchant location record is related to a financial account that can be credited; (d) a buyer registers one or more said convenient rules prior to the first purchase where each rule is comprised of: a conditional component with one or more conditions for defining which said merchant location records a buyer plans to purchase from, what range of purchase amounts are allowed and when the purchase is allowed; and an action component with at least one action for defining which said registered financial payment methods should be selected to pay for the purchase at the time of purchase when said conditional component is satisfied; (e) a buyer relates one or more said registered fingerprint records to one or more said registered convenient rules prior to the first purchase using said method; and (f) at the time of purchase, transaction information including said fingerprint record of the buyer, said merchant location record, the time and amount of purchase is used to select one or more of said registered financial payment methods, comprising the steps of: comparing said fingerprint record of the buyer at the time of purchase with all said registered fingerprint records to find a matching fingerprint record; evaluating said conditional components of said registered convenient rules related to said matched fingerprint record by comparing said transaction information to said conditional components; and evaluating the action component of only one said convenient rule where said conditional component is satisfied to select one or more of said registered financial payment methods on behalf of the buyer.

2. The method of claim 1 wherein selecting one or more of said registered financial payment methods on behalf of the buyer at the time of purchase further comprises debiting one or more of said registered financial payment methods with said amount of purchase as defined by the buyer in said action component of said convenient rule and crediting said financial account related to said merchant location record with said amount of purchase to complete the purchase on behalf of the buyer at the time of purchase.

3. The method of claim 1 wherein the purchase is further not allowed when none of said conditional components of said registered convenient rules are satisfied or more than one said conditional component of said registered convenient rules are satisfied.

4. The method of claim 1 wherein said merchant location record further includes information necessary to identify each said merchant such as a tax identification number, a merchant address or a unique identifier.

5. The method of claim 1 wherein said action component of said registered convenient rule further comprises one or more said registered financial payment methods that are selected to pay for the purchase at the time of purchase and the buyer must define how to divide the purchase amount between said registered financial payment methods when registering said convenient rules.

6. The method of claim 1 wherein said transaction information at the time of purchase further does not include information on any financial payment methods and the buyer does not provide any financial payment methods at the time of purchase.

7. A system for providing flexible payments to allow buyers to pay merchants using fingerprints of buyers and previously registered convenient rules without the need to carry and present financial payment methods [such as debit and credit cards] at the time and location of purchase, comprising: (a) means to allow a buyer to register and store one or more said fingerprints prior to any purchase using said system where a fingerprint in machine readable form is called a fingerprint record; (b) means to allow a buyer to register and store one or more said financial payment methods that can be debited; (c) means to store a list of said merchants where each merchant has one or more merchant location records and each said merchant location record is related to a financial account that can be credited; (d) means to allow a buyer to register and store said convenient rules prior to the first purchase where each rule is comprised of: a conditional component with one or more conditions for defining which said merchant location records a buyer plans to purchase from, what range of purchase amounts are allowed and when the purchase is allowed; and an action component with at least one action for defining which said registered financial payment methods should be selected to pay for the purchase at the time of purchase when said conditional component is satisfied; (e) means to store and evaluate external rules to validate financial transactions at any time as determined by parties other than buyers such as the account issuing entity or owners of said system; (f) means to allow a buyer to relate one or more said registered fingerprint records to one or more said registered convenient rules prior to the first purchase using said system; (g) means to receive transaction information at the time of purchase including said fingerprint record of the buyer, said merchant location record, the time and amount of purchase; and (h) means to select one or more said registered financial payment methods at the time of purchase, comprising the steps of: comparing said fingerprint record of the buyer at the time of purchase with all said registered fingerprint records to find a matching fingerprint record; evaluating said conditional components of said registered convenient rules related to said matched fingerprint record by comparing said transaction information to said conditional components; and evaluating the action component of only one said convenient rule where said conditional component is satisfied to select one or more of said registered financial payment methods on behalf of the buyer.

8. The system of claim 7 wherein selecting one or more of said registered financial payment methods on behalf of the buyer at the time of purchase further comprises debiting one or more of said registered financial payment methods with said amount of purchase as defined by the buyer in said action component of said convenient rule and crediting said financial account related to said merchant location record with said amount of purchase to complete the purchase on behalf of the buyer at the time of purchase.

9. The system of claim 7 wherein the purchase is further not allowed when none of said conditional components of said registered convenient rules are satisfied or more than one said conditional component of said registered convenient rules are satisfied.

10. The system of claim 7 wherein said system is further able to communicate with or can be part of payment systems of financial clearing houses and payment systems owned by financial account issuing entities.

11. The system of claim 7 wherein said system is further able to communicate with or can be part of the point of sale (POS) system at the purchase location where the purchase amount is initially calculated and the fingerprint is read at the time and location of purchase.

\* \* \* \* \*